United States Patent [19]

Mita

[11] 4,286,857
[45] Sep. 1, 1981

[54] EXPOSURE CORRECTION WARNING DISPLAY DEVICE

[75] Inventor: Kunio Mita, Kamifukuoka, Japan

[73] Assignee: Asahi Kogaku Kogyo Kabushiki Kaisha, Tokyo, Japan

[21] Appl. No.: 830,961

[22] Filed: Sep. 6, 1977

[30] Foreign Application Priority Data

Sep. 8, 1976 [JP] Japan .................................. 51-120714

[51] Int. Cl.³ ............................................. G03B 17/00
[52] U.S. Cl. ..................................... 354/289; 354/54; 354/55; 352/141
[58] Field of Search ....................... 354/53, 54, 55, 56, 354/219, 289; 352/141, 171

[56] References Cited

U.S. PATENT DOCUMENTS

| | | | |
|---|---|---|---|
| 2,289,800 | 7/1942 | Nagel | 354/219 |
| 3,277,803 | 10/1966 | Fukuoka | 352/141 |
| 3,421,422 | 1/1969 | Winkler | 354/289 |
| 3,675,558 | 7/1972 | Kuramoto et al. | 354/289 |
| 3,840,298 | 10/1974 | Okuno | 354/289 |

Primary Examiner—Russell E. Adams
Attorney, Agent, or Firm—Sughrue, Mion, Zinn, Macpeak & Seas

[57] ABSTRACT

An automatic exposure control type camera having an exposure correcting device is provided with a warning display device to indicate when the exposure correction operation of the exposure correcting device is effected. The warning display device is viewed through the camera finder in the same region that exposure information is displayed. The warning display device includes a colored but transparent film which is caused to appear in the exposure information display region when the exposure correcting device is operated.

2 Claims, 4 Drawing Figures

EXPOSURE CORRECTION WARNING DISPLAY DEVICE

BACKGROUND OF THE INVENTION

The present invention relates to an exposure correction warning device in an automatic exposure control type camera.

In the use of an automatic exposure control type camera, there are a number of special photographing conditions wherein the automatic exposure control circuitry will not provide the proper exposure. For example, when a photographer takes a picture of a person with a mountain covered with snow as a background or a picture on a stage spotlighted or a picture against the light, the exposure value which the camera provides through automatic operation is deviated from a suitable exposure value. Accordingly, there are a variety of cameras which are provided with so-called exposure correcting devices with which the photographer can manually correct electrical information concerning the exposure.

However, if after completing the photographing under the above-described special conditions the photographer forgot to restore the exposure operating member of the camera provided with such an exposure correcting device, the result would be an incorrect exposure under ordinary or standard photographing conditions.

SUMMARY OF THE INVENTION

Accordingly, an object of this invention is to provide an exposure correction warning display device in an automatic exposure control type camera, in which when exposure correction is carried out, a colored but transparent film is caused to appear in an exposure information display region in the finder. The resulting colored image gives warning to the photographer that the camera is under exposure correction conditions and reminds him to restore the exposure correction operating member under standard photographing conditions.

DETAILED DESCRIPTION OF THE INVENTION

Figure 1:
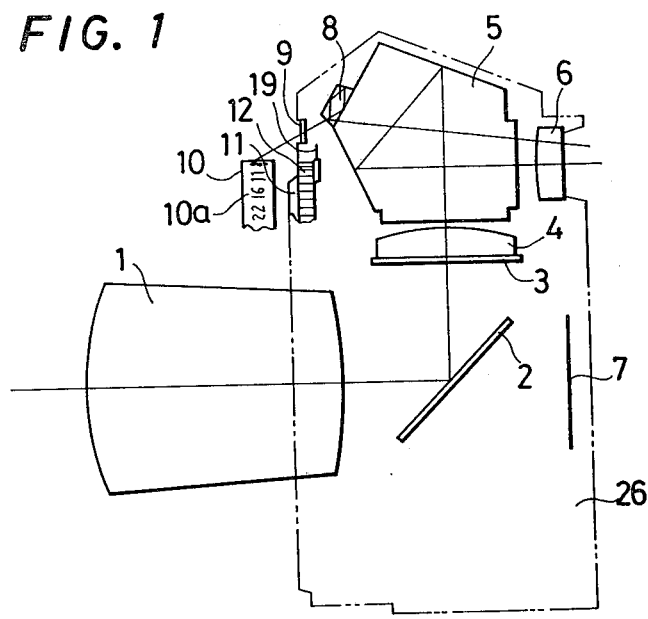
FIG. 1 is a sectional view illustrating one example of a single lens reflex camera to which the present invention is applied.

Referring now to the accompanying drawings, one embodiment of the invention will be described with respect to an automatic exposure control type single lens reflex camera. The single lens reflex camera, as shown in FIG. 1, comprises a photographing lens 1, a mirror 2, a Fresnel lens 3, a condenser lens 4, a pentaprism 5, a magnifier 6, a focusing surface or film plane 7 and a minute prism 8 for displaying lens aperture values. This minute prism 8 is provided on the pentaprism 5. The lens aperture values 10a are printed on the peripheral surface of a lens stopping ring 10 which is provided in association with the photographing lens 1 and serves to automatically adjust the lens aperture diameter. The image of a lens aperture value 10a is reflected inside the minute prism 8 after passing through an adjusting lens 9 and is displayed in the finder. The single lens reflex camera further comprises a lens mount 11 and an exposure correcting ring 12 rotatably provided around the lens mount. The ring 12 is an operating member for correcting electrical information from an automatic exposure control circuit (not shown).

Figure 2:
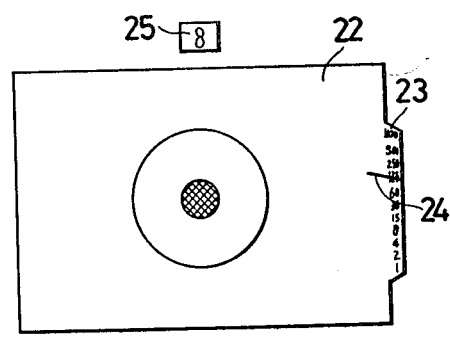
FIG. 2 is an explanatory diagram showing the field of vision of the finder of the single lens reflex camera shown in FIG. 1.

In FIG. 2, reference numeral 22 designates the field of vision of the finder. Within the field of vision is a shutter speed indicating region 23. Reference numeral 24 designates the pointer of an ammeter. Also within the field of vision is a lens aperture value indicating region 25 where the aforementioned lens aperture values 10a are optically displayed.

Figure 3:
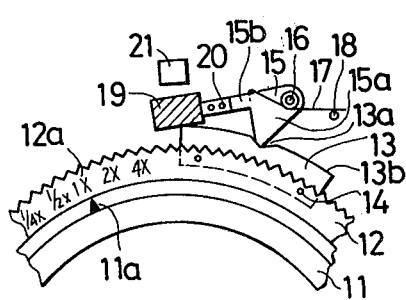
FIG. 3 is a plan view showing the state of a warning device in the camera in which exposure correction is not carried out.
Figure 4:
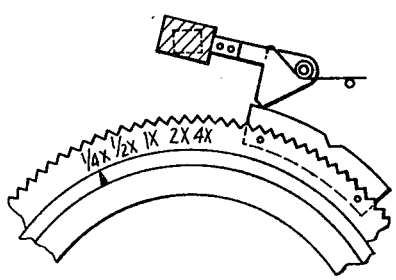
FIG. 4 is a plan view showing the state of the warning device in the camera in which exposure correction is carried out.

In FIGS. 3 and 4, reference numeral 11a designates an index engraved on the lens mount 11 in such a manner as to correspond to exposure correcting marks 12a engraved on the exposure correcting ring 12. The exposure correcting marks "¼x", "½x", "1x", "2x", and "4x" mean exposure multiples with respect to suitable exposure values which the camera operates automatically. For instance, "¼x" means ¼ of the suitable exposure; that is, it means that the exposure correction is under 2 exposure values (EV) or 2 stops. A circumferential cam 13 having a recessed portion 13a is fixedly secured to the exposure correcting ring 12 with rivets 14. A warning lever 15 is pivotally supported by a shaft 16 on the camera body and is biased by a spring 17 so as to turn counterclockwise. The cam 13 is abutted against one arm section 15a of the warning lever 15. The recessed portion 13a is so arranged that when one of the exposure correcting marks 12a of the exposure correcting ring 12 where exposure correction is not carried out, namely "1x", is set to the index 11a, the recessed portion 13a engages the arm section 15a of the warning lever 15. When the warning lever 15 is in this position, a warning plate 19 made of a transparent film whose color is relatively light, for instance orange, and fixedly secured to the other arm section 15b of the warning lever 15 with rivets 20 is out of a lens-aperture-value indicating optical path region 21. On the other hand, when the index is set to any of the exposure correcting marks 12a where exposure correction is performed, namely each of the exposure correcting marks 12a other than the "1x" mark, the uniform radius section 13b of the circumferential cam 13 is engaged with the one arm section 15a of the warning lever 15. In this case, the warning plate 19 is moved so as to cover the lens-aperture-value indicating optical path region 21.

When the exposure correcting ring 12 is, as shown in FIG. 3, set to a position where exposure correction is not carried out, or "1x" is set to the index 11a, the warning plate 19 is set out of the optical path region 21. Therefore, the lens aperture value indicating region 25 indicated in FIG. 2 is colorless. On the other hand, when the exposure correcting ring 12 is set to an exposure correction position, for example "¼x" is set on the index as shown in FIG. 4, the warning plate 19 covers the optical path region 21. Therefore, the image of the lens aperture value 10a engraved on the periphery of the lens stopping ring 10 passes through the warning plate 19 and is displayed on the lens aperture value indicating region 25. Accordingly, the image colored by the warning plate 19 can be seen. Thus, it can be confirmed at a glance that the exposure correction is carried out.

In the above-described example, the warning plate 19 is allowed to appear in the lens aperture value indicating region 25; however, it is possible to cause the warning plate 19 to appear in the shutter speed indicating region. Furthermore, in the above-described example, the exposure correcting ring 12 is provided in the vicinity of the lens mount 11; however, it goes without saying that it can be provided at any place on the camera body.

As is apparent from the above description, according to this invention, an automatic exposure control camera having an exposure correcting device and an exposure information displaying region concerning lens aperture values and shutter speed values in the finder is so designed that when the exposure correction operation of the exposure correcting device is effected, a colored but transparent film is caused to appear in the exposure information displaying region thereby to give warning. Therefore, the display section in the finder can be commonly used, and attention is collectively called to a variety of information displays in the finder. Accordingly, the oversight of warning in the case when the exposure correction is carried out can be positively prevented; that is, forgetting to restore the exposure correction operating member after photographing with exposure correction can be prevented. In addition, as the conventional display region is used for the warning display section, the construction is relatively simple, and the finder can be protected from dust or unnecessary light.

What is claimed is:

1. In an automatic exposure control type camera having a finder through which may be viewed an exposure information display region, and an exposure correcting ring which may be rotated to effect exposure correction, an exposure correction warning display device comprising:

a colored transparent film: and means operated by said exposure correcting ring for moving said film to a position to that it appears in said exposure information display region when exposure correction is effected by rotating said ring, said means comprising a circumferential cam fixedly secured to said ring and a spring biased lever on one end of which is mounted said film and the other end of which abuts said cam.

2. The exposure correction warning display device recited in claim 1 wherein said ring is marked with exposure correcting marks corresponding to exposure multiples of an exposure value which is automatically determined by the camera including a multiple of one, said cam being provided with a recessed portion corresponding to the exposure correcting mark of the multiple of one so that when said other end of said lever is engaged within said recessed portion, said film does not appear in said exposure information display region.

* * * * *